United States Patent [19]
Bradley et al.

[11] 4,179,369
[45] Dec. 18, 1979

[54] POLYMER TO AGGLOMERATE RESOLVED EMULSIONS

[75] Inventors: Robert L. Bradley, Lake Hiawatha, N.J.; Frank A. Mauceri, Clarendon Hills, Ill.

[73] Assignee: Nalco Chemical Company, Oak Brook, Ill.

[21] Appl. No.: 903,771

[22] Filed: May 10, 1978

Related U.S. Application Data

[63] Continuation-in-part of Ser. No. 550,858, Feb. 18, 1975, abandoned.

[51] Int. Cl.² ............................................. B01D 17/04
[52] U.S. Cl. ....................................... 210/43; 210/53; 252/344
[58] Field of Search ....................... 210/43, 44, 53, 51, 210/52; 252/328, 344

[56] References Cited

U.S. PATENT DOCUMENTS

| | | | |
|---|---|---|---|
| 3,691,086 | 9/1972 | Lees et al. | 210/53 |
| 3,707,464 | 12/1972 | Burns et al. | 210/44 |

Primary Examiner—Thomas G. Wyse
Attorney, Agent, or Firm—Kinzer, Plyer, Dorn & McEachran

[57] ABSTRACT

Method of resolving a water-in-oil sludge (emulsion) to separate an oil phase and a water phase, comprising the steps of treating the sludge while being agitated with a demulsifying agent to break the emulsion and an acrylamide polymer to hold the separate phases resolved.

5 Claims, 1 Drawing Figure

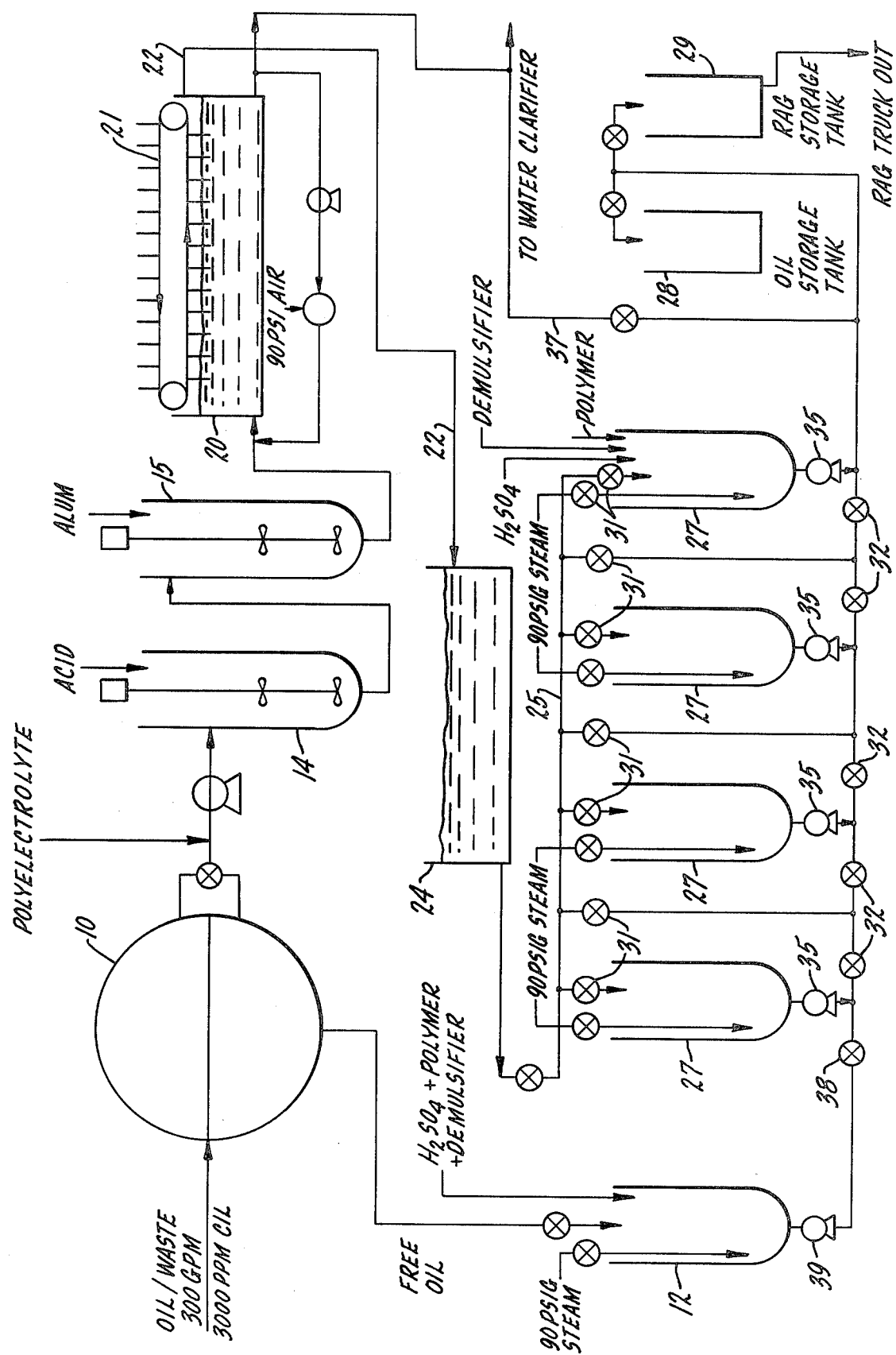

POLYMER TO AGGLOMERATE RESOLVED EMULSIONS

REFERENCE TO A RELATED APPLICATION

This application is a continuation-in-part of application U.S. Ser. No. 550,858 filed Feb. 18, 1975 abandoned.

This invention relates to the treatment of a sludge of which an intrinsic part is an oil worth recovering by demulsifying the sludge and holding the components in a resolved (phase separated) state for a sufficient period of time in order to capture the separated fractions.

The sludge here referred to is of the kind which results when oily waste water is treated with a flocculant such as an acid-alum combination or a polyelectrolyte in combination with alum or ferric chloride as a flocculant. In either case the floc produced by these treatments is floated, usually by means of a dissolved air flotation unit or by natural gravity and skimmed off. In the case of an acid-alum treatment, the sludge is primarily water. A typical acid-alum sludge contains between 5 and 25% oil. Traditionally this emulsion has been broken by the addition of ½ to 2% concentrated sulfuric acid and the resultant mixture is heated within a lead-lined cooking vessel to a temperature of 180° to 200° F. The mixture is then agitated, normally by means of a live steam sparge, and allowed to separate for a time anywhere from 4 to 24 hours. This emulsion then separates into three distinct phases. These are the oil phase, which is on top, the middle or rag phase and the subnatant acid-water phase. This acid-water contains redissolved alum and metal fines which are present in the treated waste water. Typical acid waters contain about 1% alum and up to 1% ferric sulfate with some traces of chromium and/or zinc.

The sludge generated with a polyelectrolyte and alum contains between 30 and 50% oil, is dark brown in color and has a very high viscosity. Typically the polyelectrolyte is a cationic polyamine, molecular weight (m.w.) of $10^3$ to $2 \times 10^5$. There are three possible dispositions of this type of emulsion:

1. It could be resolved into oil, rag and water. The water may be recycled but the rag must be physically discarded. The recovered oil can be sold to a reclaimer, remanufactured into hydraulic or cutting oil, or used as boiler fuel.

2. The unresolved emulsion could be collected for use as a boiler fuel.

3. The sludge must be physically discarded, incurring transportation costs.

Most plants find the second solution of feeding the entire emulsion to boilers impractical. First, the sludge contains too much water to have a high BTU content and secondly, most boilers are not capable of handling the amount of solids and other impurities contained within the emulsion. The third solution is generally unacceptable, since to transport the material involves a great expense. Further, as a double penalty, the oil which it contains is not being used as a credit to waste treatment or recovery.

Emulsion breaking is therefore deemed a more acceptable solution: that is, to find some way of resolving this emulsion into oil, rag and water as in the instance of the sludge obtained by acid-alum treatment. It was initially considered that the addition of acid alone in the amounts of ½% to 2% would resolve the emulsion. Unfortunately this was not the case. The polyelectrolyte type sludges are a great deal more concentrated an emulsion, and somewhat less in volume than the sludge produced by an acid-alum program. These sludges, on the other hand, were found to be highly resistant to resolution by the normal acid treatment method. One industrial plant, for example, found it took approximately eight volume percent concentrated sulfuric acid in order to get an acceptable resolution of their polyelectrolyte type of sludge. Using this amount of acid causes problems in the disposition and neutralization of the acid water and, for this reason, the use of acid has been found unacceptable.

An object of the present invention is, therefore, to devise a method of effectively resolving a sludge (containing oil worth recovering) produced by a polyelectrolyte treatment process. A related object is to determine the effects of the materials employed to break and resolve an oil sludge into different fractions. Another object of the invention is to inhibit the tendency of a demulsified sludge to re-emulsify in the presence of heat and mixing.

The problem of resolving an oil sludge obtained from polyelectrolyte treatment was encountered at several industrial plants employing large amounts of cutting oils or hydraulic oils used in machine tool operations. Many treatments were screened. It seemed a combination of sulfuric acid and a wetting agent, ethoxylated nonylphenol, showed promise in a laboratory test but unfortunately could not be duplicated on an industrial scale where the emulsion is to be broken in a cooking vessel charged and agitated with live steam. The steam supplies heat, both to encourage breaking of the emulsion and to induce agitation.

The laboratory test was revised to more nearly represent the industrial condition. It was observed that the combination of sulfuric acid and wetting agent, such as an ethoxylated nonylphenol, was effective initially in breaking the emulsion, but only when the flow of steam was discontinued at the precise moment the emulsion became resolved, as evidenced by visual inspection made possible by all-glass laboratory apparatus. If the flow of steam was not interrupted, or applied intermittently, re-emulsification occurred for some unknown reason. To interrupt the flow of steam on an industrial scale in this fashion is obviously impractical.

Unexpectedly it was found this same emulsion, once broken, would stay resolved for an indefinite period of time if a high molecular weight acrylamide polymer was previously introduced into the emulsion. In one instance, 200 ppm of a high molecular weight acrylamide polymer in the form of dimethyl amino ethyl methacrylate polyacrylamide copolymer (95% polyacrylamide) delayed re-emulsification indefinitely. The laboratory result was essentially duplicated on an industrial scale. Optimum treatment, established by consistently good results, is deemed to be: 1% sulfuric acid, 200 to 400 ppm of the polymer applied from a one-half percent aqueous solution, and 5000 ppm of an ethoxylated nonylphenol, HLB value 8-14.

Specifically, under the present invention, sludge-type emulsions containing an appreciable quantity of an oil such as a cutting oil or hydraulic oil employed as a coolant or lubricant in machine tooling, can be "broken" and maintained in the resolved state by heating the collected sludge (180°-200° F. is preferred) and then adding appropriate amounts of sulfuric acid, a wetting agent to break the emulsion, and a polyacrylamide to hold the broken emulsion in its resolved state, thereby allowing time to release the desired oil fraction. In some instances the addition of sulfuric acid may be eliminated while still achieving demulsification and sustained resolution, although the quality of the oil resolved may be of somewhat poorer quality (greater water or solids content).

A typical industrial treatment of cutting oil waste is shown in the drawing. The oily waste is delivered to a holding tank 10, typically containing 3000 ppm recoverable oil. The waste is essentially a water-in-oil emulsion but some free oil is present which floats to the top of tank 10. This free oil level is tapped and is delivered to a cooking vessel 12.

The remaining contents in the holding tank are pumped to two mixing tanks 14 and 15 where sulfuric acid (pH control) and alum (flocculating agent) are successively added. The polyelectrolyte identified above may be added as the contents are pumped to the mixing tanks. The emulsion as thus treated is delivered to a DAF (dissolved air floatation) tank 20 and air under pressure is admitted to produce a frothy floatation separation product.

The floatation product, a thick supernatant sludge, is skimmed off by a belt 21 equipped with paddles. The sludge is delivered across a weir (not shown) and is transmitted through a conduit 22 to a holding tank 24. The lower layer in tank 20 resulting from floatation is essentially water. It may be re-circulated or delivered for further clarification, as shown. The sludge is typically a water-in-oil emulsion containing the cutting oil to be recovered.

The sludge is delivered from tank 24 through a conduit 25 to any one of a series of cookers 27 each of which can be selectively charged with steam. The steam both agitates the sludge and furnishes heat as an inducement to breaking the emulsion. Each cooker 27 so charged with steam, and cooking vessel 12 as well, is charged with sulfuric acid (pH control), a wetting agent to break the emulsion, and a water soluble high molecular weight polyacrylamide responsible for holding the emulsion resolved, that is, to prevent re-emulsification. This results in three layers in the cooker 27. The top layer is the cutting oil to be recovered at a tank 28. The intermediate layer known as "rag" is a pure waste product containing solids such as metal trimmings, eventually delivered to a tank 29 to be trucked away. The subnatant bottom layer is essentially water.

The recovery system shown in the drawing is one in which the laboratory results were tried, successfully as noted above. There may be more cookers than the four shown and the piping in actual practice is considerably more complicated than what is shown. In principle, though, the system shown in the drawing is typical for first decanting, in effect, a so-called "free oil" product delivered to a cooker as 12, then delivering the remainder from holding tank 10 to the DAF tank 20, and delivering the sludge obtained at tank 20 to one or more cookers as 27 where that sludge is to be demulsified and more or less permanently resolved. The acrylamide polymer is responsible for holding the broken emulsion resolved for a sufficient period of time to accomplish the desired separation process.

Selected of the cookers are fully charged with sludge from tank 24 by appropriately opening a series of valves (series 31) in conjunction with another series of valves (series 32). Selected of the cookers can be idled by closing selected of the valves, each to become a holding vessel for one of the products obtained from resolving the emulsified sludge.

In any event, the sludge while being agitated and heated by steam in a selected cooker 27 is treated in the manner described above to break and resolve the sludge into three components. Again, by selecting the series 32 valves in conjunction with related pumps 35 the oil and rag layers resolved, say in the first two cookers, can in effect be decanted and collected in the other two for eventual delivery to the oil storage tank and the rag tank 29. The subnatant water layer, on the other hand, can be pumped to conduit 37 for later clarification. It is a matter of routine to select the valves and the pumps, including valve 38 and pump 39 associated with cooker 12 assigned to the so-called free oil layer obtained from the initial holding tank 10.

For all sludges successfully resolved on the industrial scale of the drawing, the optimum dosage at the cooker stage was one percent sulfuric acid, 300–400 ppm of the polymer and 5000 ppm of the wetting agent, preferably ethoxylated nonylphenol.

In one industrial application, the one shown in the drawing, the treatment for breaking and resolving the sludge in the cooker as 27, is one percent sulfuric acid followed by 300 ppm the above identified water soluble polymer (m.w. $55 \times 10^5 – 10^7$) as a one-half percent (by weight) solution in water. The sludge thus treated is agitated with steam in a lead-lined cooker for five minutes. Afterwards, 5000 ppm of ethoxylated nonylphenol are added. Resolution of the sludge into three distinct layers occurs overnight.

Another optimum industrial application in the field involves one-half percent sulfuric acid, 200 ppm of the polymer and 2000 ppm of the ethoxylated nonylphenol.

Generally the temperature of the sludge at the time of cooker treatment is 180° F., but the temperature may be higher or lower. Agitation by steam, once the treating agents are thoroughly dispersed, is not always necessary since it has been observed in the field that resolution can take place in a quiescent stage. Generally the resolution is approximately 15% rag, 85% of the available oil, remainder water for clarification.

The process is not dependent upon the use of alum or any particular polyelectrolyte to promote the formation of a sludge in the first instance. Sludges obtained without use of alum, and without use of or regard to the chemical nature of polyelectrolytes which may be used, are readily resolved under the present invention. The alum and polyelectrolyte simply assure a stable sludge for delivery to the cookers, and allow a great deal of water to be separated in the first instance at tank 20.

The preferred copolymer may be 5–45% quaternized (cationic) having an intrinsic viscosity of 13 or higher for superior activity. However, the polymer may be polyacrylamide (homopolymer) or any polyacrylamide copolymer capable of being hydrolized to polyacrylic acid. The molecular weight may be in the range of $5 \times 10^5$ to $10^7$. The quaternized cationic polymer is preferred for its high activity, but activity is also shown by 7–100% anionic as well as 5–45% cationic as already noted. For example, a 70-30 acrylamide-sodium acrylate copolymer (anionic) has been successfully employed.

Acid, added before and after sludge formation, is a pH control. If used, the cookers and other equipment must be resistant to the corrosive influence of the acid. Not all plants have cookers resistant to acid. In spite of this limitation and the inability to control pH, the sludge obtained at one such plant was successfully resolved in the cooker where 200–400 ppm of the polymer added simultaneously with 1000–2000 ppm of the nonylphenol wetting agent broke and resolved the emulsified sludge to the extent of reducing its volume by 50 to 60%, dropping out most of the water. The dewatered sludge was thereby upgraded to approximately 60% oil, reducing the cost of collecting the oil-saturated product far beyond the cost of chemical treatment under the present invention and resulting in a product susceptible to centrifuging to recover the oil.

The preferred wetting agent is ethoxylated nonylphenol, HLB value 8–14 as noted. This gives the best results in combination with the acrylamide polymer but other wetting agents of emulsion breaking character may be used such as calcium dodecyl benzosulfonate. The wetting agent, in fact, is responsible not only for breaking the emulsion in the first place but is also responsible for accelerating the separation of oil from the rag. This is established by the following data where the amount of rag oil remaining (after ten minutes of standing) is inversely proportional to the dose of wetting agent, the amount of acid (1%) and the above-identified acrylamide copolymer (200 ppm) being constant using steam agitation at 210° F. for ten minutes of mixing:

Table 1

| Wetting Agent Dosage (ppm) | Oil Phase Level (mm) | Rag Phase Level (mm) |
|---|---|---|
| 2500 | 1.5 | 65 |
| 3000 | 1.5 | 65 |
| 3500 | 1.5 | 65 |
| 4000 | 15.0 | 55 |
| 4500 | 23.0 | 43 |
| 5000 | 25.0 | 41 |

In one industrial application 4500–5000 ppm of the wetting agent were found necessary to free the oil from the rag in a full scale cooker system, such as shown in the drawing, sufficiently fast to recycle that cooker in a 24-hour period.

Data were collected to ascertain the effects of varying the acrylamide copolymer dosage while holding constant the dose of acid and demulsifying agent, sparging the sludge with steam at 210° F. At that point 1% concentrated sulfuric acid was added, followed by the addition of a variable dosage of acrylamide copolymer. The mixture was again mixed using the steam sparge for 3 minutes followed by a dosage of 4,000 ppm of the ethoxylated phenol. The steam sparge was left on continuously for the remainder of the test. The time between the first break after the addition of the emulsion breaker and the point in which the emulsion reinverted was taken. The results of these experiments are as follows:

Table 2

| Acrylamide Copolymer (ppm) | Time to Inversion |
|---|---|
| 200 | 45 minutes |
| 150 | 13 minutes |
| 100 | 11 minutes |
| 50 | 8 minutes |
| 0 | 5 minutes |

These data clearly indicate that the time for reinversion of the sludge is proportional to the dose of the acrylamide.

It will be seen from the foregoing the problem concerns an emulsified sludge very difficult to resolve, when said sludge formation is promoted by a polyelectrolyte. However, the sludge is rich in oil and worth resolving by a conventional steam sparge such as successfully applied to more easily resolved sludges. The problem was successfully surmounted by combining a demulsifier and an acrylamide polymer during steam sparging, preferably with the addition of sulfuric acid.

The drawing is only illustrative. Some plants are not nearly so sophisticated, indeed having no water clarifier and no lead-lined cookers. Other plants are more sophisticated. In any event, the sludge is hot (preferably 180°–200° F.) and is under agitation when the acrylamide and the demulsifying agent are added. Agitation may then be continued or discontinued. In one industrial application the treatment of the sludge at 180° F. was one percent sulfuric acid, 200 ppm the above-identified acrylamide copolymer and 5000 ppm of the demulsifying agent. A temperature of 180° F. was maintained for one hour but without mixing, resulting in good resolution.

The over-all systems in actual practices will therefore vary widely. In this connection, experience with the industrial application where acid is not used presents an unexplained phenomenon of the present invention. The demulsifier alone does not always break that emulsion. Rather, in the majority of the testing, the combination of the demulsifier and the acrylamide polymer are both necessary, first to break the emulsion and hold it in the resolved state, and secondly to drop out the water and oil phases. This observation supports the conclusion that there is a synergism in the combination, both in acid and non-acid treatments. Laboratory testing of the same phenomenon in a non-acid medium showed that the acrylamide copolymer alone induced some water separation but there was no real resolution of the water phase until the demulsifier was added. Further laboratory testing on this same point showed that larger doses of the demulsifier contributed proportionally to an accelerated rate of water drop-out but a point of high dosage can also be reached where the resolved emulsion tends to invert. Therefore, as stated above, in actual practice the optimum treatment in terms of ppm must be determined by trial and error, especially to avoid an amount of the demulsifier likely to induce a defeating inversion.

The demulsifying agent (surfactant) may be nonionic of HLB value 8–16 including ethoxylated alkyl phenols, ethoxylated amines and ethoxylated fatty alcohols; it may be an anionic surface active agent including sulfo succinates and the salts of sulfonic acid.

The preferred acid is sulfuric acid, but phosphoric acid may also be used.

It is to be emphasized we are concerned with a water-in-oil emulsion (sludge) in which oil is the continuous or external phase unlike the emulsions of U.S. Pat. Nos. 3,691,086 and 3,707,464 concerned with oil-in-water emulsions. The two are wholly different. For example, while the polymer used to separate the oil-in-water emulsion according to U.S. Pat. No. 3,691,086 may be suited to that emulsion and may be considered the same polymer as presently used to hold the emulsion resolved, the present acrylamide polymer by itself (used without the present demulsifier) is incapable of breaking a water-in-oil emulsion, let alone holding it resolved, even when employed in amounts from 50 ppm up to 1000 ppm. Indeed, at a level of 1000 ppm the polymer renders the sludge so viscous that the sludge is in fact stabilized.

Likewise, while a demulsifier by itself may be capable of separating the oil-in-water emulsion according to U.S. Pat. No. 3,707,464, the demulsifier here specified (which may be considered the same as that of the patent) is not capable of holding the emulsion resolved (it re-emulsifies) when used by itself (no polymer) even up to 20000 ppm.

While the stream sparge for hot agitation is the more common practice, the present practice may also be applied to sludges agitated mechanically in which event the sludge is kept hot by steam coils. In this same connection the temperature may be anywhere in the range of 160° F.–240° F.

The present practice also reduces the amount of the rag phase (the rag is tighter or stiffer) compared to the known practice of treating the sludge with sulfuric acid. Some acid may be used as an aid, but it is not always necessary as has been explained.

A demulsifier in the form of ethoxylated nonylphenol is preferred but equivalents are listed and may be employed.

We claim:

1. A method of resolving an emulsified oily sludge, in which oil is the external phase, to separate an oil phase and a water phase during agitation of the sludge while it is hot, at least about 180° F., and comprising treating the sludge with at least about 4500 ppm of a demulsifying agent to break the emulsion and adding at least about 200 ppm of an acrylamide polymer concurrently to retard re-emulsification for a protracted period of time, adding about ½ to 2% acid, and separating said phases, during said time period, said demulsifying agent being selected from the group consisting of ethoxylated amines, ethoxylated fatty alcohols, sulfo succinates, and salts of sulfonic acid, and said polymer being polyacrylamide or acrylamide copolymer which hydrolyzes to polyacrylic acid of molecular weight $5 \times 10^5$ to $10^7$.

2. A method according to claim 1 wherein formation of the sludge is promoted by a polyelectrolyte in the form of a cationic polyamine of molecular weight $10^3$ to $2 \times 10^5$.

3. A method of recovering oil from a water-in-oil emulsified sludge and comprising, heating the sludge to a temperature of at least about 180° F. conducive to emulsion breaking, agitating the hot sludge and adding substantially concurrently to the agitated sludge at least about 4500 ppm of a demulsifying agent and at least about 200 ppm of an acrylamide polymer respectively in amounts to break the emulsion into oil and water phases and to prevent re-emulsification, adding about ½ to 2% acid, and separating the resolved phases, said demulsifying agent being selected from the group consisting of ethoxylated amines, ethoxylated fatty alcohols, sulfo succinates, and salts of sulfonic acid, and said polymer being polyacrylamide or acrylamide copolymer which hydrolyzes to polyacrylic acid of molecular weight $5 \times 10^5$ to $10^7$.

4. A method according to claim 3 in which the demulsifying agent is a surfactant of HLB value 8–14.

5. A method according to claim 1 or 3 in which the polymer is dimethyl amino ethyl methacrylate polyacrylamide.

* * * * *